United States Patent
Ekonen et al.

(10) Patent No.: US 11,142,066 B2
(45) Date of Patent: Oct. 12, 2021

(54) REAR DRIVE MODULE HAVING A RING GEAR DISCONNECT AND SYNCH-LOCK MECHANISM

(71) Applicant: Linamar Corporation, Guelph (CA)

(72) Inventors: Todd R Ekonen, Brighton, MI (US); Dennis Cook, Royal OaK, MI (US); Gary Monkaba, Troy, MI (US); Shun Ohno, Abu (JP)

(73) Assignee: Linamar Corporation, Guelph (CA)

( * ) Notice: Subject to any disclaimer, the term of this patent is extended or adjusted under 35 U.S.C. 154(b) by 214 days.

(21) Appl. No.: 15/775,975

(22) PCT Filed: Nov. 14, 2016

(86) PCT No.: PCT/US2016/061831
§ 371 (c)(1),
(2) Date: May 14, 2018

(87) PCT Pub. No.: WO2017/083821
PCT Pub. Date: May 18, 2017

(65) Prior Publication Data
US 2018/0326844 A1 Nov. 15, 2018

Related U.S. Application Data

(60) Provisional application No. 62/254,279, filed on Nov. 12, 2015.

(51) Int. Cl.
*F16H 48/22* (2006.01)
*B60K 17/35* (2006.01)
(Continued)

(52) U.S. Cl.
CPC ............ *B60K 17/35* (2013.01); *B60K 17/354* (2013.01); *B60K 23/0808* (2013.01);
(Continued)

(58) Field of Classification Search
CPC combination set(s) only.
See application file for complete search history.

(56) References Cited

U.S. PATENT DOCUMENTS 8,436,854 B2 5/2013 Downs et al.
2003/0054913 A1* 3/2003 Sayama .................... B60K 6/26
475/203

(Continued)

FOREIGN PATENT DOCUMENTS

EP 2131155 3/2010

*Primary Examiner* — Charles A Fox
*Assistant Examiner* — Ryan P Dodd
(74) *Attorney, Agent, or Firm* — Miller Canfield

(57) ABSTRACT

A rear drive module for an all-wheel drive motor vehicle includes a differential assembly having an outer differential housing and an inner differential housing, the inner differential housing being fixed for rotation with an output shaft of the differential assembly; a ring gear assembly having a ring gear mounted to and fixed for rotation with the outer differential housing; and a disconnect and synch-lock mechanism: operable to synchronize and lock the inner differential housing and the outer differential housing, and to disconnect the inner differential housing and the outer differential housing to prevent rotation of the outer differential housing and the ring gear. The disconnect and synch-lock mechanism may include a synchronizer clutch and a clutch actuator. The clutch actuator may be a ball-ramp or face cam mechanism which is configured to control the operation of the synchronizer clutch and locking between the inner and outer differential housings.

9 Claims, 4 Drawing Sheets

(51) Int. Cl.
  *B60K 17/354* (2006.01)
  *B60K 23/08* (2006.01)
  *F16H 48/34* (2012.01)
  *F16D 13/46* (2006.01)
  *F16D 27/112* (2006.01)
  *F16D 23/12* (2006.01)

(52) U.S. Cl.
  CPC ............ *F16D 13/46* (2013.01); *F16D 27/112* (2013.01); *F16H 48/22* (2013.01); *F16H 48/34* (2013.01); *F16D 2023/123* (2013.01)

(56) References Cited

U.S. PATENT DOCUMENTS

| | | | | |
|---|---|---|---|---|
| 2006/0052207 | A1* | 3/2006 | Teraoka | F16H 48/08 |
| | | | | 475/231 |
| 2007/0095628 | A1 | 5/2007 | Niederbacher | |
| 2010/0240486 | A1* | 9/2010 | Pritchard | F16D 13/04 |
| | | | | 475/220 |
| 2011/0143878 | A1 | 6/2011 | Juenemann et al. | |
| 2016/0193915 | A1* | 7/2016 | Cooper | B60K 17/348 |
| | | | | 475/220 |

* cited by examiner

REAR DRIVE MODULE HAVING A RING GEAR DISCONNECT AND SYNCH-LOCK MECHANISM

CROSS-REFERENCE TO RELATED APPLICATIONS

This application claims priority to U.S. provisional patent application No. 62/254,279, filed Nov. 12, 2015.

FIELD

The present disclosure relates to a rear driveline assembly and a mechanism for synchronizing and disconnecting a ring gear in the rear driveline assembly.

BACKGROUND

Vehicles can include a disconnectable power transfer unit (PTU) and a rear driveline module (RDM) which allow switching of the operation of the vehicle between two-wheel and four-wheel drive modes. During two-wheel drive mode, the RDM and PTU may be disconnected to minimize energy losses and provide better fuel efficiency. Coupling mechanisms may be provided on the rear driveline axle for disconnecting and synchronizing of the driveline before reconnecting the RDM.

Energy losses such as churning losses and parasitic losses may occur when components in the RDM are rotated, such as the ring gear of a hypoid gearset which may be immersed or partially immersed in lubricating fluid. The gearset may continuously rotate when transferring torque to the shafts of the rear wheels. The gearset also may continue rotate when PTU is disconnected and the wheels are moving but the gearset is not transferring torque.

SUMMARY

According to one embodiment of the present application, there is provided a rear drive module for an all-wheel drive motor vehicle. The rear drive module includes a differential assembly having an outer differential housing and an inner differential housing, the inner differential housing being fixed for rotation with an output shaft of the differential assembly; a ring gear assembly having a ring gear mounted to and fixed for rotation with the outer differential housing; and a disconnect and synch-lock mechanism operable to synchronize and lock the inner differential housing and the outer differential housing, and to disconnect the inner differential housing and the outer differential housing to prevent rotation of the outer differential housing and the ring gear.

In some embodiments, the disconnect and synch-lock mechanism includes a synchronizer clutch and a clutch actuator.

The synchronizer clutch may include a multi-plate clutch having a drum fixed for rotation with the outer differential housing, a first set of plates connected to the drum, and a second set of plates connected to the inner differential housing.

In some embodiments, the clutch actuator is operable to generate an axial force in a first direction towards the differential assembly to activate the synchronizer clutch.

In some embodiments, the clutch actuator is a ball ramp mechanism. The ball ramp mechanism may include a first cam plate defining a first groove, a second cam plate defining a second groove facing the first groove, and at least one actuator ball disposed between the first cam plate and the second cam plate in the first and second grooves. Relative rotation of the first and second cam plates causes axial translation of the second cam plate in the first direction for axial movement of an adjacent apply plate to activate the synchronizer clutch. In some embodiments, the apply plate further comprises a spring configured to bias the second earn plate towards the first cam plate.

In some embodiments, the apply plats further comprises a spring and a ball, and a first surface of the second cam plate defines one or more detents for engaging the ball of the apply plate.

In some embodiments of the rear drive module, for synchronizing and locking the inner differential housing and the outer differential housing, the first and second grooves and the at least one actuator ball of the ball ramp mechanism are configured to first cause axial movement of the second cam plate in the first direction to activate the synchronizer clutch, and then allow axial movement of the second cam plate in a second direction, opposite the first direction, to connect the second cam plate and the drum.

In some embodiments, an outer portion of the second cam plate is configured with a splined connection to engage the drum of the synchronizer clutch when the inner differential housing and the outer differential housing are locked.

In some embodiments, for disconnecting the inner differential housing and the outer differential housing, the first and second grooves and the at least one actuator hall are configured to cause axial movement of the second cam plate in the first direction to disengage the second cam plate and the drum.

In some embodiments, the clutch actuator comprises a face cam mechanism. For synchronizing and locking the inner differential housing and the outer differential housing, the face cam mechanism is configured to first cause axial movement of the second cam plate in the first direction to activate the synchronizer clutch, and then allow axial movement of the second cam plate in a second direction, opposite the first direction, to connect the second cam plate and the drum.

In any of the embodiments described above, the ring gear and the disconnect and synch-lock mechanism may be mounted on opposite lateral sides of the differential assembly. In any of the embodiments described above, the ring gear assembly is a cantilevered ring gear assembly. In any of the embodiments described above, the clutch actuator is electromagnetically actuated.

BRIEF DESCRIPTION OF THE DRAWINGS

Reference will now be made, by way of example, to the accompanying drawings which show example embodiments of the present application, and in which.

DESCRIPTION OF EXAMPLE EMBODIMENTS

The present disclosure is directed to a rear driveline assembly and specifically, a rear driveline module with a mechanism to selectively synchronize and lock, and to disconnect, a ring gear of a hypoid gearset with the rotating components of a differential assembly.

Figure 1:
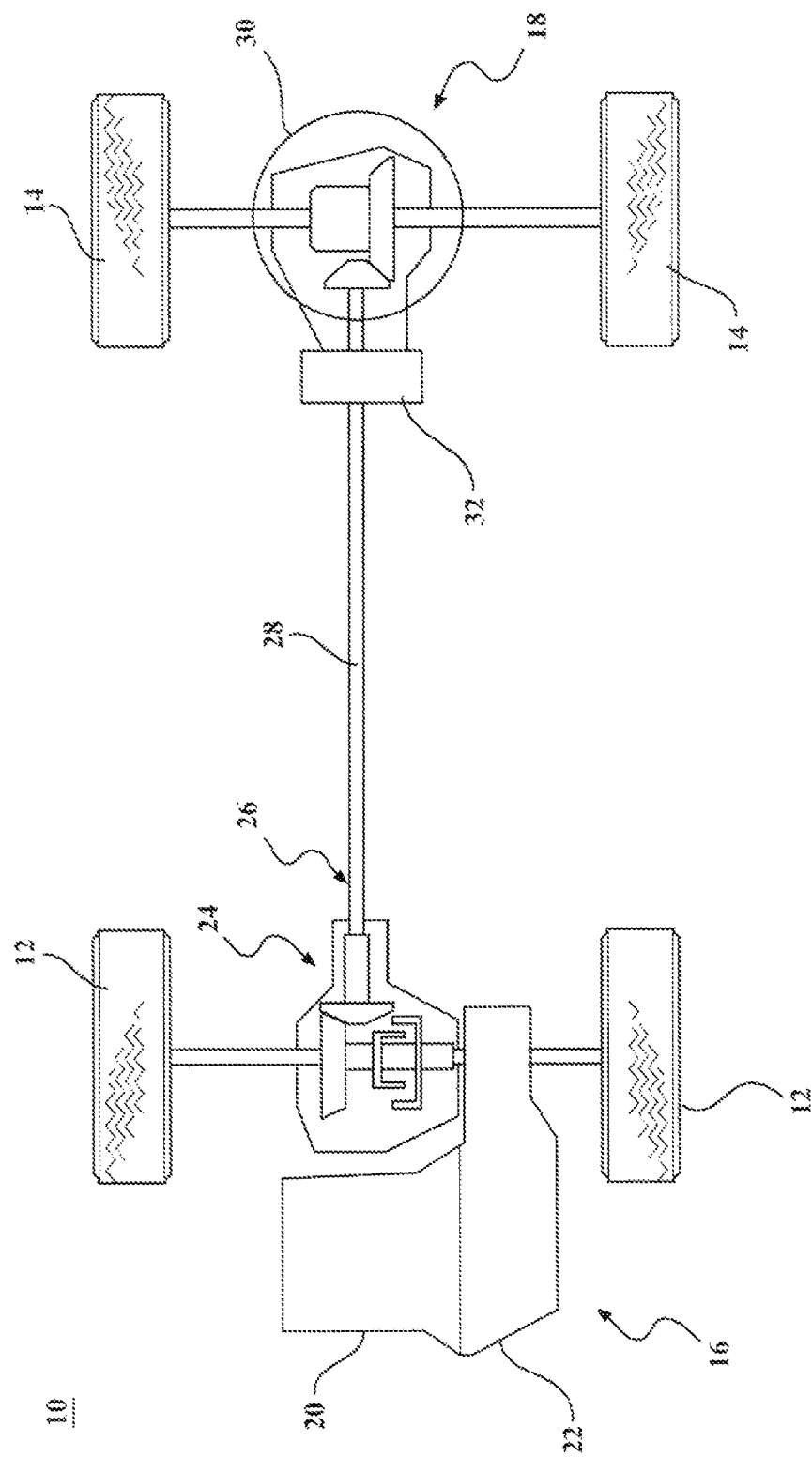
FIG. 1 illustrates a vehicle drive train having a rear driveline assembly according to an embodiment of the present disclosure.

An exemplary vehicle drive train assembly 10 for transferring torque to first set of wheels 12 and a second set of wheels 14 of a vehicle is illustrated in FIG. 1. The drive train assembly 10 includes a front driveline 16 and a rear driveline 18. The front driveline 16 includes, among other components, an engine 20, a transmission 22 and a power transfer unit 24 (PTU). The PTU 24 includes an output 26 to transmit torque through a propeller shaft 28 to a rear drive module 30 (RDM) for driving the rear wheels 14. An all wheel drive (AWD) coupling assembly 32 is provided between the RDM 30 and the front driveline 16 to control coupling and torque distribution between the front and rear drivelines 14, 16. The AWD coupling assembly 32 may be a standard hang-on coupling. In one embodiment, the AWD coupling assembly 32 comprises an intelligent torque control coupling (ITCC). A controller (not shown) may be in communication with the components in the front driveline 16 and rear driveline 18 and also in communication with one or more sensors located throughout the vehicle.

Figure 2:
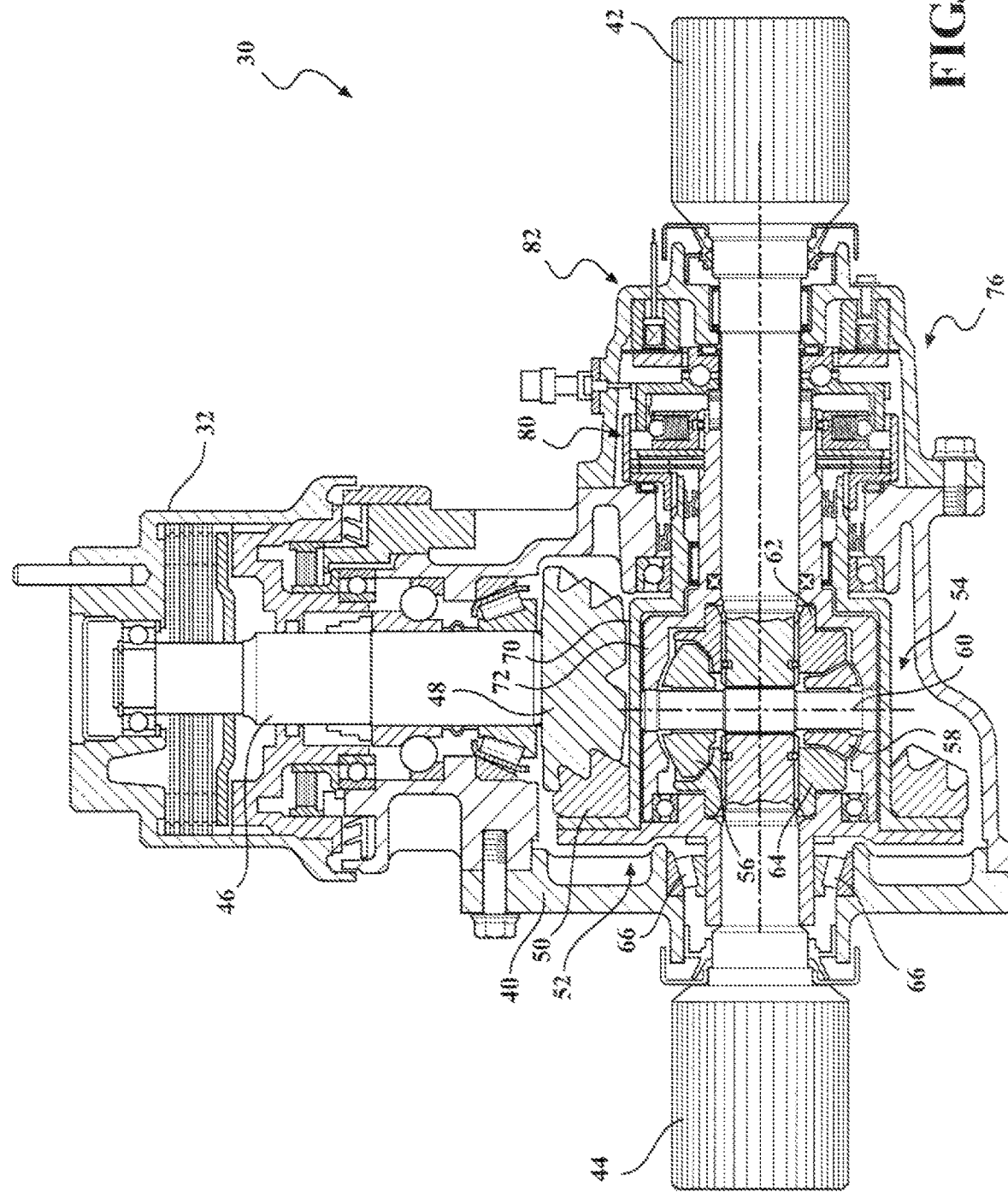
FIG. 2 illustrates a rear driveline assembly and a rear drive module according to an embodiment of the present disclosure.

A cross-section view of the RDM 30 and AWD coupling assembly 32 is illustrated in FIG. 2. The RDM 30 includes a case 40 which receives and contains the various components of the RDM 30 and which may facilitate mounting of the ROM 30 to the vehicle. The ROM 30 transfers torque to a right rear wheel 14 of a vehicle through a right output shaft 42, and to a left rear wheel 14 of a vehicle through a left output shaft 44. A pinion shaft 46 is received through the AWD coupling assembly 32 and terminates with a pinion gear 48. The pinion gear 48 is part of a hypoid gearset which includes a cantilever mounted ring gear 50 in meshed engagement with the pinion gear 48.

The ring gear 50 is mounted to and fixed for rotation with a housing 52 of a differential assembly 54. The differential assembly 54 may be a standard assembly and include various gear arrangements. A differential assembly 54 is illustrated in FIG. 2 with first and second pinion gears 56, 58 fixed for rotation with a differential pin 60. Right and left side gears 62, 64 are in meshed engagement with the first and second pinion gears 56, 58. The right and left side gears 62, 64 are fixed for rotation with the respective right and left output shafts 42, 44 for transferring torque to the right and left rear wheels 14. The housing 52 of the differential assembly 54 is supported within the RDM 30 on multiple bearings 66.

Figure 3:
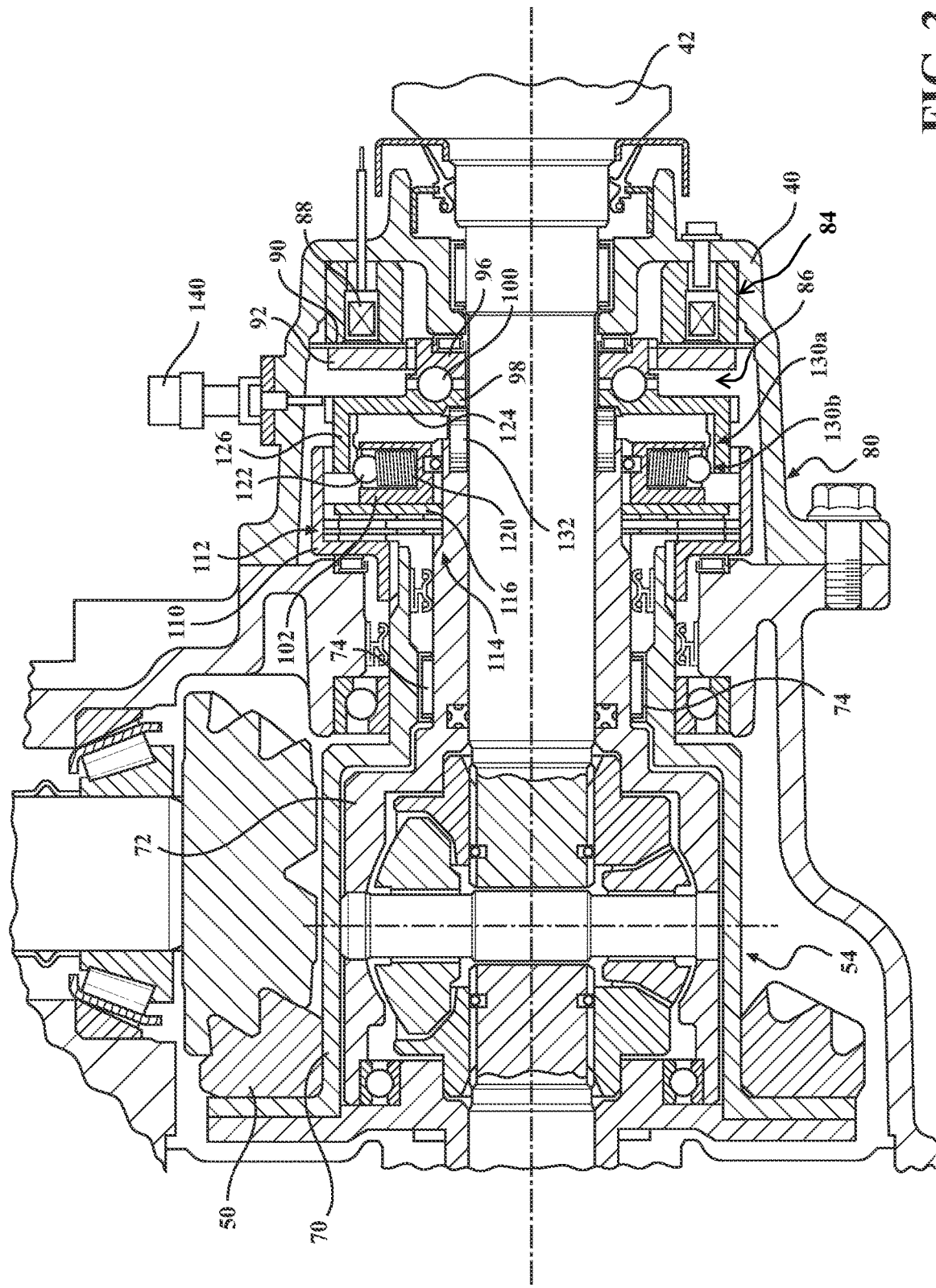
FIG. 3 illustrates an enlarged partial view of a portion of the rear drive module of FIG. 2 with a disconnect and synch-lock mechanism in a first position.
Figure 4:
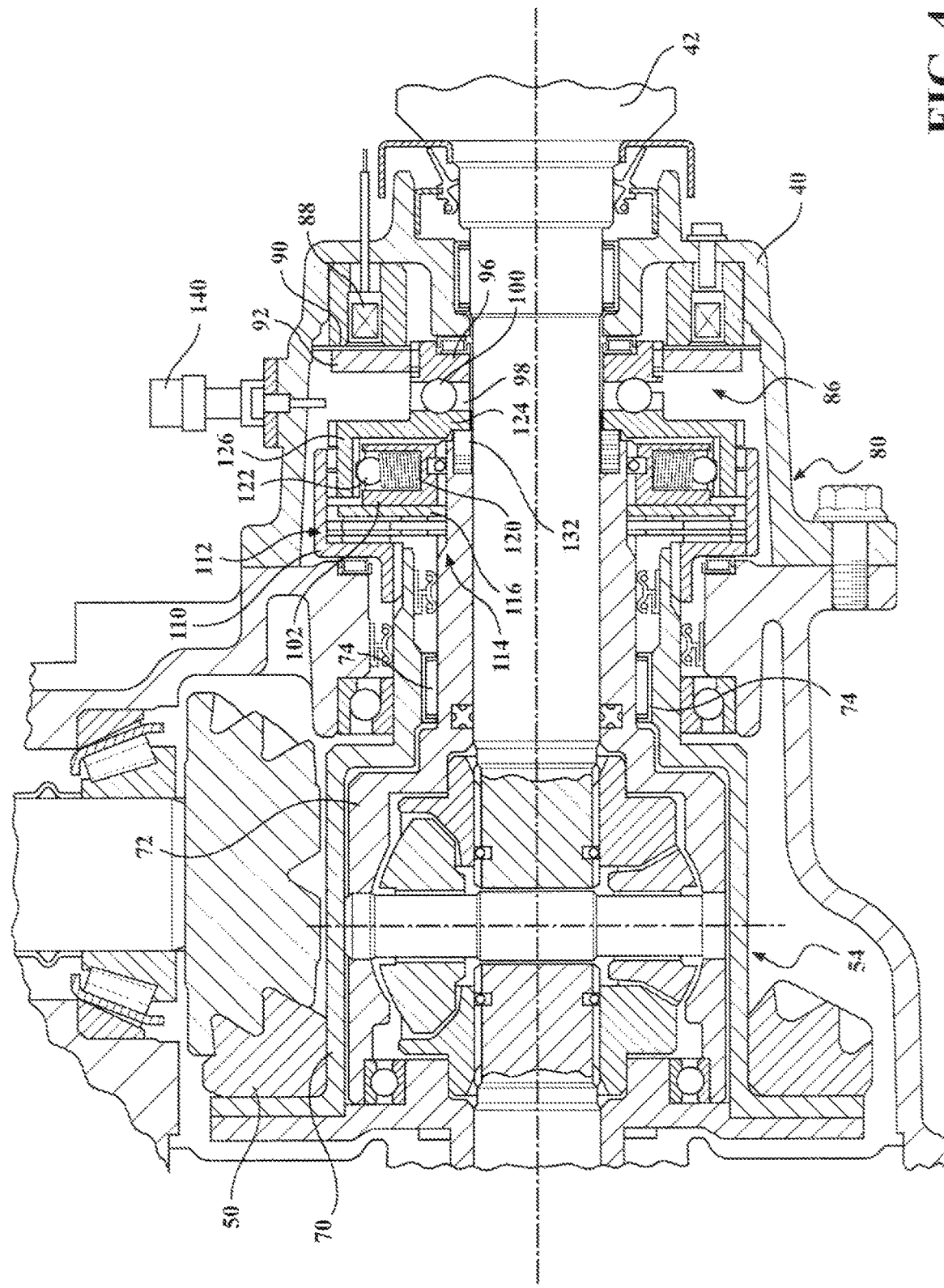
FIG. 4 illustrates an enlarged partial view of a portion of the rear drive module of FIG. 2 with the disconnect and synch-lock mechanism in a second position.

In one embodiment, which also can be seen in the enlarged views of FIGS. 3 and 4, the housing 52 includes an outer differential housing 70 and an inner differential housing 72. The ring gear 50 is mounted to and fixed for rotation with the outer differential housing 70. The differential pin 60 is mounted to the inner differential housing 72. The inner differential housing 72 is fixed for rotation with the right output shaft 42. One or more bearings, such as needle bearings 74 may be position between the outer differential housing 70 and the inner differential housing 72. A disconnect and synch-lock mechanism 76 is actuated to selectively disconnect and synchronize and lock the outer and inner differential housings 70, 72. The disconnect and synch-lock mechanism 76 is mounted concentric with an output shaft of the differential assembly 54 on a side laterally opposite to the mounting of the ring gear 50.

When the outer and inner differential housings 70, 72 are synchronized and locked together, torque received through the pinion shaft 46, pinion gear 48 and ring gear 50 is transferred to the rear wheels 14 through the differential assembly 54 and right and left output shafts 42, 44. When the outer and inner differential housings 70, 72 are disconnected, such as when torque is not being provided from front driveline 16 for driving the rear wheels 14, this prevents rotation of the outer differential housing 70 and ring gear 50 and churning and parasitic bearing losses associated therewith.

In one embodiment, the disconnect and synch-lock mechanism 78 includes a synchronizing clutch or synch clutch BO which is operable to synchronize and lock, or to disconnect, the outer and inner differential housings 70, 72. A clutch actuator 82 is operable to apply an axial force inwardly towards the differential assembly 54 in order to actuate the synch clutch 80. The synch clutch 80 may be multi-plate wet clutch and the same fluid may be used to lubricate the synch clutch 80 and other components of the RDM 30. Alternatively, the synch clutch 80 may fee sealed and provided with a separate lubricant.

In one embodiment, the clutch actuator 82 includes an electromagnetically actuated pilot clutch 84 and a ball ramp mechanism 86 as shown in FIGS. 2, 3 and 4. As described below, the ball ramp mechanism 86 is fixed for rotation with the inner differential housing 72. The pilot clutch 84 consists of a coil assembly 88 which is adjacent a pilot clutch plate 90 and armature 92. The pilot clutch plate 90 is connected to the case 40 of the RDM 30 such as through a splined and grounded connection. Inner members (not shown) of the pilot clutch 84 are connected to a first cam plate 96 of the ball ramp mechanism 86.

A second cam plate 98 is spaced apart from and faces the first cam plate 96. One or more grooves are defined in an inner face of each of the first and second cam plates 96, 98. An actuator ball 100 is positioned in the cavity defined by each pair of corresponding grooves. As shown in FIGS. 3 and 4, in one embodiment, a first pair of grooves and an actuator ball 100 are positioned in the first and second cam plates 96, 98, above the right output shaft 42. A second pair of grooves and an actuator ball 100 are positioned in the first and second cam plates 96, 98, below the right output shaft 42. Each of the grooves may be ramped, tapered or shaped in a circumferential direction to configure the operation of the ball ramp mechanism 86 and the clutch actuator 82. In other embodiments, the clutch actuator 82 includes an electromagnetically actuated pilot clutch 84 and a face cam mechanism (not shown). The face cam mechanism includes first and second cam plates with ramped or shaped surfaces configured to control axial movement of the second cam plate towards the synch clutch 80.

Relative rotation or movement of the first and second cam plates 96, 98 causes axial translation of the second cam plate 98 along the direction of the longitudinal axis of the right output shaft towards the synch clutch 80. Specifically, axial movement of the second cam plate 98 applies an axial force to an apply plate 102 to actuate the synch clutch 80, as described further below. The synch clutch 80 includes a drum 110 which is fixed for rotation with the outer differential housing 70. A first set of plates 112 is connected to the drum 110 and a second set of plates 114 is connected to the inner differential housing 72. An end plate 116 is connected to the inner differential housing 72. The end plate 115 is adjacent the apply plate 102.

The apply plate 102 is connected to and fixed for rotation with the inner differential housing 72. The apply plate 102 defines a cavity for receiving a spring 120 and a ball 122. The cavity faces outwardly, transverse to the longitudinal axis of the right output shaft 42. In one embodiment, a first portion 124 of the second cam plate 98 also extends outwardly, transverse to the longitudinal axis of the right output shaft 42. A second portion 126 of the second cam plate 98 extends at ah angle from the first portion 124 such that the second portion 126 of the second cam plate 98 extends towards and over the apply plate 102 to engage the ball 122. Specifically, a bottom or inner surface of the second portion 126 of the cam plate 98 engages the ball 122 and defines at least one detent 130 for receiving the ball 122.

FIG. 3 shows the disconnect and synch-lock mechanism 76 and outer and inner differential housings 70, 72 in a synchronized and locked state with the ball ramp mechanism 86 closed. A spring 132 is disposed at an outer end of the inner differential housing 72 between the apply plate 102 and the second cam plate 98 in order to bias the ball ramp mechanism 86 in the closed position. FIG. 4 shows the disconnect and synch-lock mechanism 76 and outer and inner differential housings 70, 72 in a disconnected state with the ball ramp mechanism 86 open.

During operation, the outer and inner differential housings 70, 72 are connected together in one state via a splined connection between the drum 110 and the second portion 126 of the second cam plate 98. The second cam plate 98 also has a splined connection with inner differential housing 72 such that the outer and inner differential housings 70, 72 are locked and synchronized to rotate together. To disconnect the outer and inner differential housings 70, 72, the coil assembly 88 is energized which pulls the armature 92 into the pilot clutch 84, causing the rotation of the first cam plate 96 to slow slightly relative to the rotation of the second cam plate 98. As a result, the actuator ball 100 moves within a first portion of the grooves configured in the first and second cam plates 96, 98, resulting in axial movement of the second cam plate 98 towards the differential assembly 54. As the second cam plate 98 moves, the second portion 126 pushes on the ball 122 and spring 120 until the ball 122 is aligned with a first detent 130a in the second portion 96 of the cam plate 98. In this position, as shown in FIG. 4, the synch clutch 80 and the splines between the second portion 126 of the cam plate 98 and the drum 110 are disengaged and this state remains once the coil assembly 88 is de-energized. The outer and inner differential housings 70, 72 are disconnected such that rotation of the inner differential housing 72 associated with the movement of the wheels 14 and rotation of the right output shaft 42 is not translated to the outer differential housing 70 and ring gear 50.

To synchronize and lock the outer and inner differential housings 70, 72, the coil assembly 88 is energized again causing the rotation of the first cam plate 96 to slow slightly relative to the rotation of the second cam plate 98. As a result, the actuator ball 100 moves in a second portion of the grooves configured in the first and second cam plates 96, 98. The grooves in the first and second cam plates 96, 98 are configured such that the position of actuator ball 100 first causes a slight axial movement of the second cam plate 98 towards the differential assembly 54. A small force is applied by the second cam plate 98 on the apply plate 102 via the ball 122 and spring 120 in order to activate the synch clutch 80. As the synch clutch 80 is engaged and the difference in rotation of the inner and outer differential housings 72, 70 approaches zero, the actuator ball 100 travels further in the third portion of the grooves configured in the first and second cam plates 96, 98. This third portion is configured with a sharp transition which causes a quick decrease in space between the first and second cam plates 96, 98 as the spring 132 forces axial movement of the second cam plate 98 away from the differential assembly 54 and towards the first cam plate 96. In this position, the outer and inner differential housings 70, 72 are again connected together via the splined connection between the drum 110 and the second portion 126 of the second cam plate 98 as shown in FIG. 3. The axial movement of the second cam plate 98 described during this transition also causes a change in position between the second portion 126 of the second cam plate 98 and the ball 122 and spring 120. The ball 122 rests in a second detent 130b defined in the second portion 126. These positions are maintained once the coil assembly 88 is de-energized.

By adding the disconnect and synch-lock mechanism 76 between outer and inner differential housings 70, 72, rotation of the ring gear 50 may be stopped in desired modes of operation of a vehicle. This may be achieved with a standard AWD coupling assembly 32 and modifications only to the right side of the case 40 of the RDM 30 and some of the internal components of the differential assembly 54.

The disconnect and synch-lock mechanism 76 and clutch actuator 82 have been described above with electromagnetic actuation through the coil assembly 88. The coil assembly 88 may be activated by a controller of the vehicle in response to data received from one or more sensors 140 in the vehicle. In this embodiment, no high power motor or high power controller is required, thus reducing the power required to operate the disconnect and synch-lock mechanism 76 and providing a better response for the synchronization of the outer and inner differential housings 70, 72.

It will be appreciated that in other embodiments, other mechanisms to apply force to the synch clutch 80 may be used. Such other mechanisms may include, but are not limited to, electro-mechanical actuation mechanisms or electro-hydraulic actuation mechanisms, such as a hydraulic piston.

In other embodiments with a different configuration of the synch clutch 80 (not shown), the apply plate 102 also may include a dog clutch to engage an end portion of either the outer or inner differential housing 70, 72.

Certain adaptations and modifications of the described embodiments can be made. Therefore, the above discussed embodiments are considered to be illustrative and not restrictive. Other combinations and configurations of the driveline components described herein may include the RDM 30 and disconnect and synch-lock mechanism 76 within the scope of the present disclosure.

The invention claimed is:

1. A rear drive module for an all-wheel drive motor vehicle comprising:
a differential assembly having an outer differential housing and an inner differential housing, the inner differential housing being fixed for rotation with an output shaft of the differential assembly;
a ring gear assembly having a ring gear mounted to and fixed for rotation with the outer differential housing; and
a disconnect and synch-lock mechanism operable to synchronize and lock the inner differential housing and the outer differential housing, and to disconnect the inner differential housing and the outer differential housing to prevent rotation of the outer differential housing and the ring gear, the disconnect and synch-lock mechanism comprising a synchronizer clutch, a clutch actuator, an apply plate having a cavity, and a spring and a ball received within the cavity of the apply plate;

wherein the synchronizer clutch comprises a multi-plate clutch having a drum fixed for rotation with the outer differential housing, a first set of plates connected to the drum, and a second set of plates connected to the inner differential housing;

wherein the clutch actuator is operable to generate an axial force in a first direction towards the differential assembly to activate the synchronizer clutch and the clutch actuator comprises a ball ramp mechanism, and wherein the ball ramp mechanism comprises a first cam plate defining a first groove, a second cam plate defining a second grove facing the first groove and the second cam plate having a first surface that defines one or more detents for engaging the ball received within the cavity of the apply plate, and at least one actuator ball disposed between the first cam plate and the second cam plate in the first and second grooves, wherein relative rotation of the first and second cam plates causes axial translation of the second cam plate in the first direction for axial movement of an adjacent apply plate to activate the synchronizer clutch.

2. The rear drive module according to claim 1 wherein the disconnect and synch-lock mechanism further comprises a spring configured to bias the second cam plate towards the first cam plate.

3. The rear drive module according to claim 1 wherein, for synchronizing and locking the inner differential housing and the outer differential housing, the first and second grooves and the at least one actuator ball are configured to first cause axial movement of the second cam plate in the first direction to activate the synchronizer clutch, and then allow axial movement of the second cam plate in a second direction, opposite the first direction, to connect the second cam plate and the drum.

4. The rear drive module according to claim 3 wherein an outer portion of the second cam plate is configured with a splined connection to engage the drum of the synchronizer clutch when the inner differential housing and the outer differential housing are locked.

5. The rear drive module according to claim 1 wherein, for disconnecting the inner differential housing and the outer differential housing, the first and second grooves and the at least one actuator ball are configured to cause axial movement of the second cam plate in the first direction to disengage the second cam plate and the drum.

6. The rear drive module according to claim 1 wherein the clutch actuator comprises a face cam mechanism.

7. The rear drive module according to claim 1 wherein the ring gear and the disconnect and synch-lock mechanism are mounted on opposite lateral sides of the differential assembly.

8. The rear drive module according to claim 1 wherein the ring gear assembly comprises a cantilevered ring gear assembly.

9. The rear drive module according to claim 1 wherein the clutch actuator is electromagnetically actuated.

* * * * *